(12) United States Patent
Wilkinson

(10) Patent No.: US 6,708,746 B2
(45) Date of Patent: Mar. 23, 2004

(54) EMERGENCY TRACTION APPARATUS FOR VEHICLE TIRES

(76) Inventor: J. Kim Wilkinson, 105 E. Los Arboles Dr., Tempe, AZ (US) 85284

(*) Notice: Subject to any disclaimer, the term of this patent is extended or adjusted under 35 U.S.C. 154(b) by 0 days.

(21) Appl. No.: 09/755,575

(22) Filed: Jan. 8, 2001

(65) Prior Publication Data
US 2002/0088519 A1 Jul. 11, 2002

(51) Int. Cl.$^7$ .......... B60C 17/00; B60C 19/00; B60C 17/04
(52) U.S. Cl. .......... 152/221; 152/217
(58) Field of Search .......... 152/217, 218, 152/221, 222

(56) References Cited

U.S. PATENT DOCUMENTS

| | | | | | |
|---|---|---|---|---|---|
| 1,830,983 A | * | 11/1931 | Lopatto | .......... | 152/222 |
| 1,859,656 A | * | 5/1932 | Cunnington | .......... | 152/221 |
| 2,058,799 A | * | 10/1936 | Jacks | .......... | 152/222 |
| 2,533,151 A | * | 12/1950 | Stevens | .......... | 152/221 |
| 2,538,134 A | * | 1/1951 | Trautwein | .......... | 152/221 |
| 2,560,198 A | * | 7/1951 | Stevens | .......... | 152/221 |
| 2,679,882 A | * | 6/1954 | Rich | .......... | 152/222 |
| 2,685,903 A | * | 8/1954 | Lutey | .......... | 152/221 |
| 2,946,366 A | * | 7/1960 | Saperstein | .......... | 152/221 |
| 3,107,714 A | * | 10/1963 | Zeitlin | .......... | 152/221 |
| 4,402,357 A | * | 9/1983 | Granryd | .......... | 152/218 |
| 5,070,923 A | * | 12/1991 | Tanaka | .......... | 152/218 |
| 5,454,412 A | * | 10/1995 | Bowers | .......... | 152/221 |
| 5,934,055 A | * | 8/1999 | Steele | .......... | 152/222 |
| 6,308,757 B1 | * | 10/2001 | Bright | .......... | 152/221 |

* cited by examiner

Primary Examiner—S. Joseph Morano
Assistant Examiner—Jason R. Bellinger
(74) Attorney, Agent, or Firm—H. Gordon Shields

(57) ABSTRACT

Traction enhancing apparatus for a vehicle wheel includes a strap securable to a wheel and a sleeve disposed on the strap. The sleeve includes friction enhancing elements extending the full length of the sleeve and the strap includes cooperating locking elements at opposite ends of the strap. A plurality of such strap and sleeve elements are easily secured to a vehicle wheel under emergency conditions, such as snow, ice, or the like, to enhance the traction of the vehicle wheel.

18 Claims, 3 Drawing Sheets

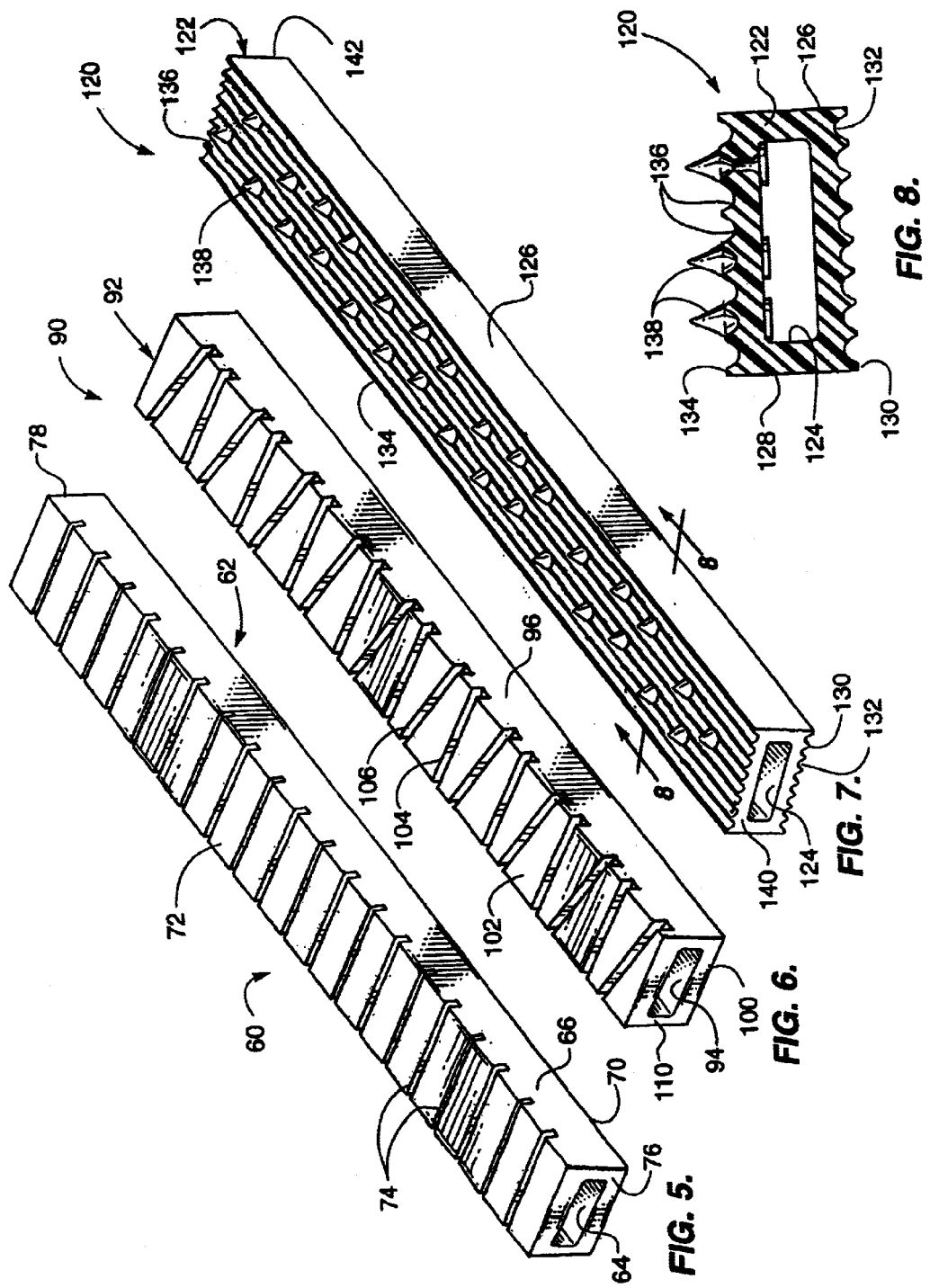

EMERGENCY TRACTION APPARATUS FOR VEHICLE TIRES

BACKGROUND OF THE INVENTION

1. Field of the Invention

This invention relates to traction apparatus for vehicles and, more particularly, to traction elements securable to a tire for obtaining traction in emergency situations, such as snow, and the like.

2. Description of the Prior Art

U.S. Pat. No. 5,454,412 (Bowers) discloses a traction enhancement device which includes a serrated strap element, with the serrations on one side, and cooperating lock elements remote from the serrations at opposite ends of the strap. The apparatus is a one piece unit designed to be disposed about a tire, with several of the elements, spaced apart, on the tire to provide the desired traction.

The apparatus of the present invention differs from the '412 apparatus in that two elements are used, a base strap and a sleeve which is disposed on the strap. The sleeve includes friction engaging elements for providing traction for the full length of the sleeve element. This significantly increases the traction of the apparatus for the wheel.

SUMMARY OF THE INVENTION

The invention described and claimed herein comprises a flexible plastic strap having cooperating locking or securing elements at opposite ends of the strap for securing the strap to a wheel. A sleeve member is disposed on the strap and the strap is then secured to a wheel. In practice, several of the straps, probably at least about three, strap and sleeve elements are used on a wheel to enhance or increase the traction of the wheel under adverse conditions, such as snow, ice, or the like. The sleeve elements include serrations or slots that extend the full length of the sleeve to provide traction enhancement across the full width of the tire. The sleeve elements may be extruded and then cut to the desired lengths to fit on the straps.

Among the objects of the present invention are the following:

To provide new and useful traction apparatus for a vehicle wheel;

To provide new and useful emergency traction apparatus securable to a wheel;

To provide new and useful traction elements including a sleeve having traction enhancing elements thereon and a strap for receiving the sleeve and securable to a vehicle wheel;

To provide new and useful traction enhancing apparatus including a strap having cooperating locking elements at opposite ends and a sleeve disposed on the strap and having traction enhancing elements extending the full length of the sleeve; and To provide new and useful traction and enhancing elements including a plastic strap and a plastic sleeve disposed on the plastic strap.

BRIEF DESCRIPTION OF THE DRAWING

FIG. 5 is a perspective view of an alternate embodiment of the apparatus of the present invention.

FIG. 6 is a perspective view of another alternate embodiment of the apparatus of the present invention.

FIG. 7 is a perspective view of another alternate embodiment of the apparatus of the present invention.

FIG. 8 is a view in partial section of the apparatus 120 taken generally along line 8—8 of FIG. 7.

DESCRIPTION OF THE PREFERRED EMBODIMENT

Figure 1:
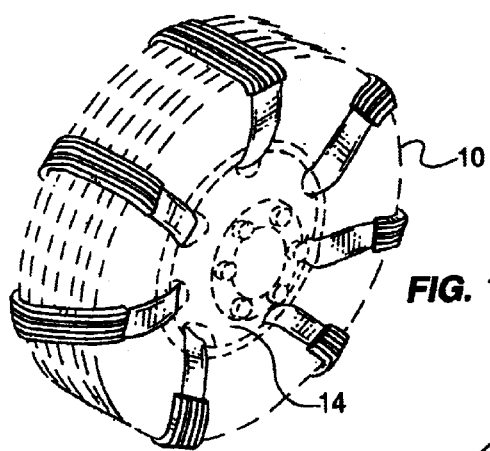
FIG. 1 is a perspective view of a tire with the apparatus of the present invention secured thereto.

FIG. 1 is a perspective view of a wheel 10, shown in dash dot line, with a plurality of emergency traction elements 20 secured thereto. The tire 10 is mounted on a rim 12. The rim 12 includes a number of rim openings 14 extending there through. The traction elements 20 are secured to the tire 10 through the rim openings 14.

Figure 2:
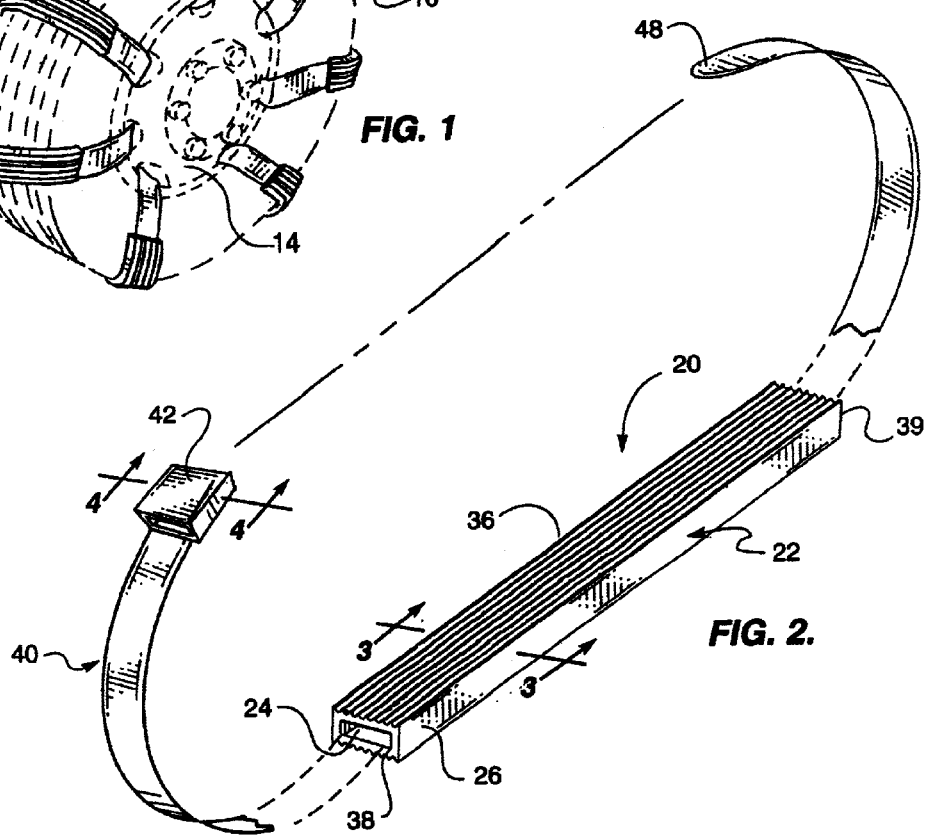
FIG. 2 is a perspective view of apparatus of the present invention.
Figure 3:
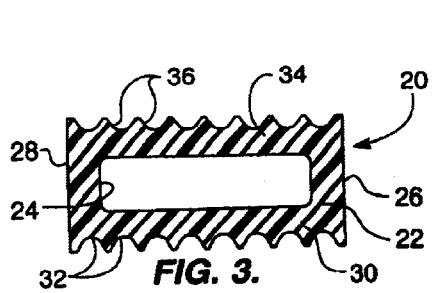
FIG. 3 is a view in partial section taken generally along line 3—3 of FIG. 2.

A traction element 20 is shown in FIG. 2. FIG. 2 comprises a perspective view of a traction element 20 with a fastening strap 40 shown extending there through. FIG. 3 is a view in partial section of the emergency traction element 20 taken generally line 3—3 of FIG. 2. For the following discussion, reference will primarily be made to FIGS. 2 and 3.

The emergency traction apparatus 20 includes a relatively elongated and generally rectangularly configured sleeve 22. Extending through the sleeve, longitudinally, is an inner bore 24. The sleeve 22 includes a pair of sides 26 and 28, a bottom 30, and a top 34. A plurality of longitudinally extending grooves 32 extend along the bottom 30, and a plurality of generally longitudinally extending grooves 36 extend along the top 34. The grooves 32 and 36 cooperate to provide traction. The sleeve 22 is thus, with respect to top and bottom, substantially identical, and there accordingly is not a preferred way of orienting the sleeve with respect to the tire 10.

The sleeve 22 also includes a pair of ends 38 and 39. The ends 38 and 39 are generally parallel to each other.

It will be noted that the sleeve 22 is preferably made of a flexible or resilient material, such as plastic, that will conform somewhat to the curvature of the tire, as best shown in FIG. 1. The "top" and "bottom" portions of the sleeve 20 may more nearly accurately be considered as "inner" and "outer" portions, however interchangeable they may be. That is, the "inner" portion may be disposed against the tire, and the "outer" portion will face outwardly, or away from the tire, and thus be in contact with the road as the tire 10 rotates.

Figure 4:
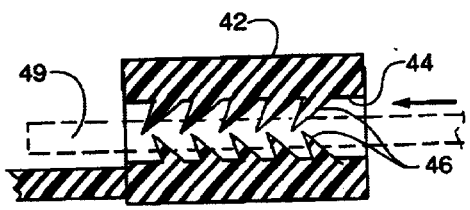
FIG. 4 is a view in partial section taken generally along line 4—4 of FIG. 2.

The sleeve 22 is secured to the tire by a strap 40. The strap 40 is again preferably made of plastic material and may be a well known tie element with a buckle 42 at one end, The buckle 42 is shown in FIG. 4, which is a side view in partial section of the buckle 42. The buckle 42 includes a bore 44 with inwardly extending gripper teeth 46. The strap 40 includes an end 48 which extends through a buckle 42, The gripper teeth allow the end 48 to extend inwardly in essentially a one way movement, and the gripper teeth 46 oppose the movement of the end 48 outwardly. The one way movement is illustrated by the relatively large arrow in FIG.

4. Thus, a strap is essentially a disposable unit, and must be cut off the tire when the need for the traction apparatus 20 is over. Obviously, a user may have as many straps as necessary for multiple use of a sleeve 22, and as many sleeves as deemed appropriate under the circumstances. As best shown in FIG. 2, the sleeve 20 is adjustable or positionable on the strap 40.

An alternate design of the sleeve 22 is illustrated in FIG. 5, which shows the traction apparatus 60, without a strap 40. The traction apparatus 60 includes a sleeve 62, which again has a generally rectangular configuration. The sleeve 62 includes an inner bore 64 which extends longitudinally through the sleeve 62. The sleeve 62 also includes a pair of sides, of which the sides 66 is shown in FIG. 5. The sleeve 62 also includes a bottom 70 and a top 72. The top 72 includes a plurality of transversely extending slots or grooves 74 which help to provide the traction required of the apparatus. The sleeve 66 also includes a pair of ends, including an end 76 and an end 78. The ends 76 and 78 are generally parallel to each other as are the pair of sides, and also as are the top and bottom portions. A strap 40 extends through the bore 64 to secure the sleeve 62 to a wheel.

Unlike the sleeve 22 of the apparatus 20, the sleeve 62 includes transversely extending slot 74 only on the top 72. Thus, the top 72 is the outer portion of the sleeve 62, with the bottom 70 disposed against the tire and the top 72 extending outwardly.

It will be noted that the slots 74 are generally parallel to each other and generally perpendicular to the longitudinal axis of the sleeve 62. A different configuration of slots is shown in FIG. 6.

FIG. 6 is a perspective view of another alternate embodiment of the traction apparatus of the present invention and comprising an alternate embodiment 90. The alternate embodiment 90 includes a sleeve 92 which is substantially identical to the sleeve 62 in general configuration. It includes a generally rectangular cross sectional configuration with an inner bore 94 extending longitudinally of the sleeve 92. The sleeve includes a pair of sides, of which side 96 is shown. The sleeve 92 also includes a bottom 100 and a top 102. Extending downwardly in the top 102 are slots 104 and 106. The slots 104 and 106 extend obliquely transverse with respect to the longitudinal axis of the sleeve 92, as opposed to the parallel transverse orientation of the slots 74 of the sleeve 62. The obliquely oriented slots 104 and 106 may provide better traction under some circumstances than do the slots 74 of the sleeve 62.

Alternate slots are parallel, thus providing offsetting traction enhancement. That is, there is double parallelism with slots 104 disposed in a parallel arrangement, to provide the offsetting traction enhancement. On the other hand, such oblique orientation may also be obliquely parallel, without the alternate oblique pattern shown.

Once again, the apparatus 90 is preferably made of a plastic, as is the apparatus 60, and the apparatus 20, as discussed above. And, once again, like the sleeve 62, the top 102 is the outer portion of the apparatus 92, with the bottom 100 disposed against the tire and the top 102 facing outwardly.

FIG. 7 is a perspective view of another alternate embodiment of the apparatus of the present invention, comprising an embodiment 120. For the following discussion, reference will primarily be made to FIGS. 7 and 8.

Alternate embodiment traction apparatus 120 includes a sleeve 122 which also has a generally rectangular cross sectional configuration. Extending longitudinally through the sleeve 122 is a bore 124. Disposed about the bore 124, and part of the sleeve 122, is a side 126 and a side 128. The two sides 126 and 128 are generally parallel to each other. The sleeve 122 also includes a bottom 130 and a plurality of longitudinally extending slots 132 are disposed on the bottom 130.

Generally parallel to the bottom 130 is a top 134. Again, a plurality of longitudinally extending slots 136 extend along the top 134. Extending upwardly from the slots 136 are studs 138. The studs 138, of course, are used to provide additional traction, when needed.

The sleeve also includes a pair of ends 140 and 142, which are generally parallel to each other.

The apparatus 120 includes the longitudinally extending slots 132 and 136 to provide additional traction for the tire and the apparatus 12. The bottom slots 132 are against the tire of the vehicle (see FIG. 1) and the slots 136 on the top or outer portion of the sleeve 122 extend outwardly, and accordingly provide the traction for the wheel or tire. Thus, the bottom slots 132 help to prevent the apparatus 120 from slipping or moving on the tire, and the slots 136, together with the studs 138 together with the studs 138, provide additional traction for, relatively difficult driving situations, such as icy conditions.

The longitudinally extending slots help to also disperse any slush or other material which might otherwise tend to decrease the frictional enhancing abilities of the apparatus 120.

The studs 138, as can be best understood from FIG. 8, are molded into the top 134. The bottom portion of the studs 138 extend into the longitudinally extending bore 124.

Figure 9:
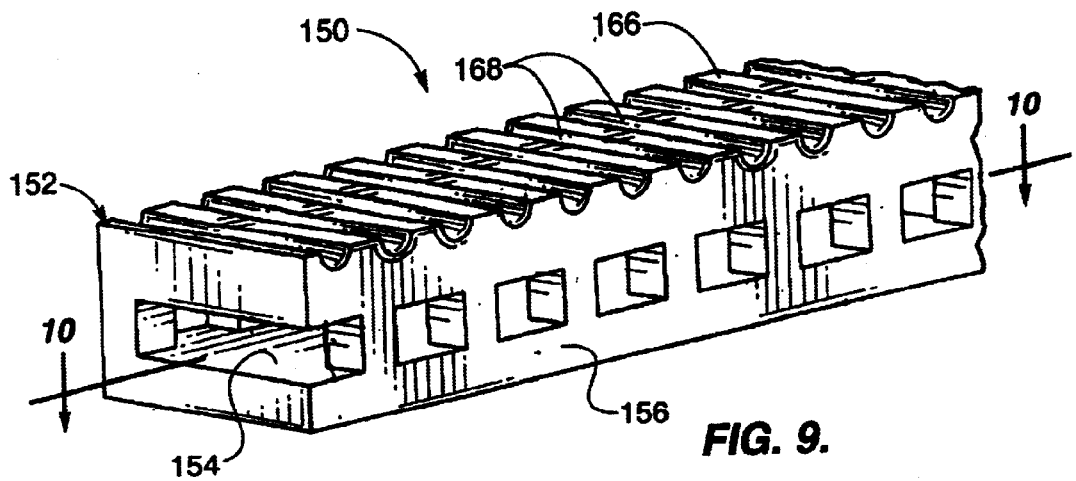
FIG. 9 is a perspective view of another alternate embodiment of the apparatus of the present invention.
Figure 10:
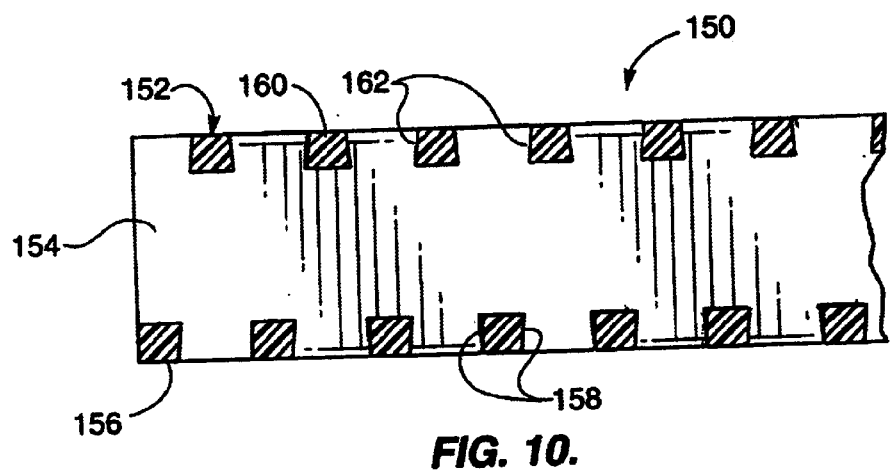
FIG. 10 is a view in partial section taken generally along line 10—10 of FIG. 9.

Another alternate embodiment of the traction enhancing apparatus is shown in FIGS. 9 and 10. FIG. 9 is a perspective view of traction apparatus 150, and FIG. 10 is a view in partial section taken generally along line 10—10 of FIG. 9. Reference may be made to both Figures for the following discussion. The construction of the traction enhancing apparatus 150 is somewhat different from that of the above discussed units in that it includes a plurality of apertures which communicate with a longitudinally extending bore.

The apparatus 150 includes a sleeve 152 which, like the other embodiments discussed above, has a generally rectangular cross sectional configuration. A bore 154 extends longitudinally through the sleeve 152. The sleeve includes a pair of sides 156 and 160, and a plurality of rectangularly configured apertures extend through the sides and communicate directly with the bore 154. Apertures 158 extend through the side 156, and apertures 162 extend through the side 160. For convenience, the configuration of the apertures is generally rectangular.

The sleeve 152 also includes a bottom and a top 166 which is generally parallel to the bottom. Extending transversely along the top are parallel grooves 168. The grooves 168 are somewhat larger than are the grooves 74 of the traction enhancing apparatus 60 and they have a curved configuration, as opposed to the generally rectangular configuration of the groove 74. The larger grooves 168 may provide additional area for traction enhancement and for the disposal of snow, mud, etc. The open area of the apparatus 150 also enhances the flexibility of the sleeve with respect to longitudinal bending or flexing to conform to tire configuration.

It will be noted that the cross sectional configuration of all of the embodiments is generally rectangular. This configuration lends itself readily to molding and also to maximizing the area of traction enhancement overall. The longitudinally extending bores are also generally rectangular in configuration for convenience. They, of course, receive the straps 40, discussed above in conjunction with FIGS. 1 and 2. Moreover, all of the traction enhancement units are flexible so as to conform to the configuration of the tire, as illustrated in FIG. 1, and as mentioned above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Emergency traction apparatus for a vehicle tire comprising in combination:

an elongated sleeve having a bore;

disposable strap means extending through the bore in the sleeve for securing the sleeve to a vehicle tire; and means for enhancing the traction of the sleeve, including a plurality of grooves on the sleeve.

2. The apparatus of claim 1 in which the grooves of the means for enhancing the traction of the sleeve extend longitudinally along the sleeve.

3. The apparatus of claim 1 in which the grooves of the means for enhancing the traction of the sleeve extend transversely on the sleeve.

4. The apparatus of claim 3 in which the transverse grooves are generally parallel to each other.

5. The apparatus of claim 3 in which the grooves extend obliquely.

6. The apparatus of claim 5 in which the oblique grooves are alternatingly parallel.

7. The apparatus of claim 1 in which the sleeve further includes two sides, a bottom, and a top.

8. The apparatus of claim 7 in which the grooves are disposed on the top.

9. The apparatus of claim 8 in which the grooves are also disposed on the bottom.

10. The apparatus of claim 7 in which the sleeve further includes apertures extending through the sides and communicating with the bore.

11. The apparatus of claim 1 in which the sleeve is flexible to conform to the tire configuration.

12. The apparatus of claim 1 in which the sleeve has a generally rectangular cross sectional configuration.

13. Emergency traction apparatus for a vehicle tire comprising in combination:

a strap securable to a vehicle tire;

sleeve means securable to and adjustable on the strap; and traction enhancing means on the sleeve means.

14. The apparatus of claim 13 in which the sleeve means includes a bore through which the strap extends.

15. The apparatus of claim 13 in which the sleeve means includes a top portion and a bottom portion, and the traction enhancing means are on the top portion and the bottom portion.

16. The apparatus of claim 13 in which the strap means is disposable and the sleeve means may be used multiple times.

17. Emergency traction apparatus for a vehicle tire comprising in combination:

an elongated sleeve having a bore;

disposable strap means extending through the bore in the sleeve for securing the sleeve to a vehicle tire; and means for enhancing the traction of the sleeve, including a plurality of grooves on the sleeve and studs extending outwardly from the sleeve.

18. The apparatus of claim 13 in which the traction enhancing means includes a plurality of grooves.

* * * * *